United States Patent [19]

Dedoes

[11] 4,326,591
[45] Apr. 27, 1982

[54] SOIL CORING IMPLEMENT
[75] Inventor: Jerry A. Dedoes, Wixom, Mich.
[73] Assignee: Dedoes Industries, Inc., Walled Lake, Mich.
[21] Appl. No.: 121,432
[22] Filed: Feb. 14, 1980
[51] Int. Cl.³ ............................................ A01B 45/02
[52] U.S. Cl. ..................................................... 172/22
[58] Field of Search ............................. 172/22, 21, 91
[56] References Cited

U.S. PATENT DOCUMENTS

| | | | |
|---|---|---|---|
| 2,042,597 | 6/1936 | Hargreaves | 172/21 X |
| 2,845,015 | 7/1958 | Carawan | 172/91 X |
| 3,264,877 | 8/1966 | Boxrud | 172/22 X |
| 3,331,249 | 7/1967 | Boxrud | 172/22 X |
| 3,429,378 | 2/1969 | Mascaro | 172/22 |
| 3,643,746 | 2/1972 | Dedoes | 172/22 X |
| 4,081,034 | 3/1978 | Hines | 172/22 |
| 4,148,362 | 4/1979 | Orth | 172/22 |

FOREIGN PATENT DOCUMENTS 2737144  3/1979  Fed. Rep. of Germany ........ 172/22

Primary Examiner—Paul E. Shapiro
Attorney, Agent, or Firm—Gifford, VanOphem, Sheridan & Sprinkle

[57] ABSTRACT

A soil penetrating and coring implement is provided and is adapted to be towed by a vehicle across the round surface to remove plugs of soil from the ground. The coring implement comprises a tubular and cylindrical rim having a plurality of circumferentially extending slots formed through it and the slots are both circumferentially and axially spaced from each other. The entire rim is rotatably mounted on an axle which in turn is connected to the towing vehicle. A plurality of elongated mounting assemblies are pivotally secured within the interior of the rim so that the mounting assemblies are circumferentially spaced about the interior of the rim and have their axes parallel to but radially spaced from the axis of the rim. A plurality of tubular coring elements are secured to each mounting assembly so that each coring element extends diametrically through and radially outwardly from one side of the tube. Each coring element registers with and extends through one of the rim slots so that the coring elements protrude radially outwardly from the rim.

3 Claims, 4 Drawing Figures

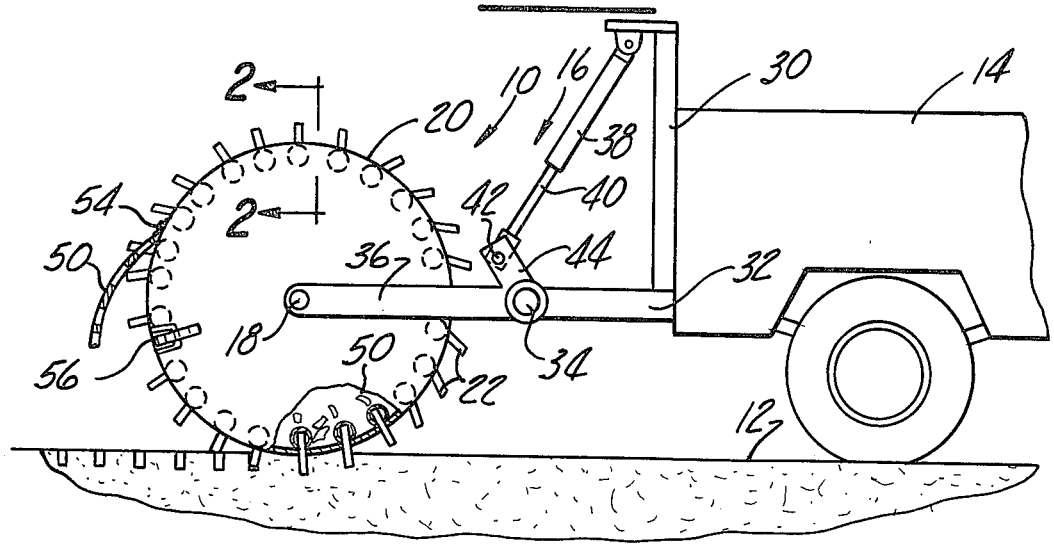
Fig-1
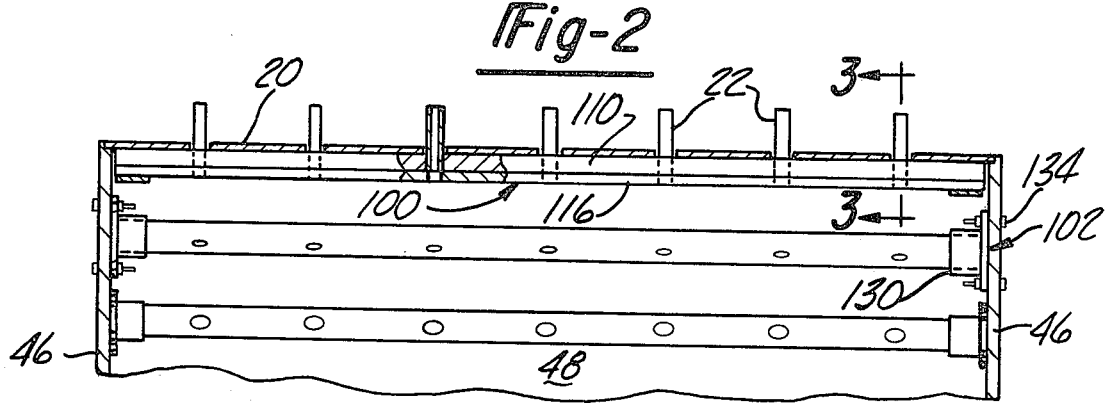
Fig-2
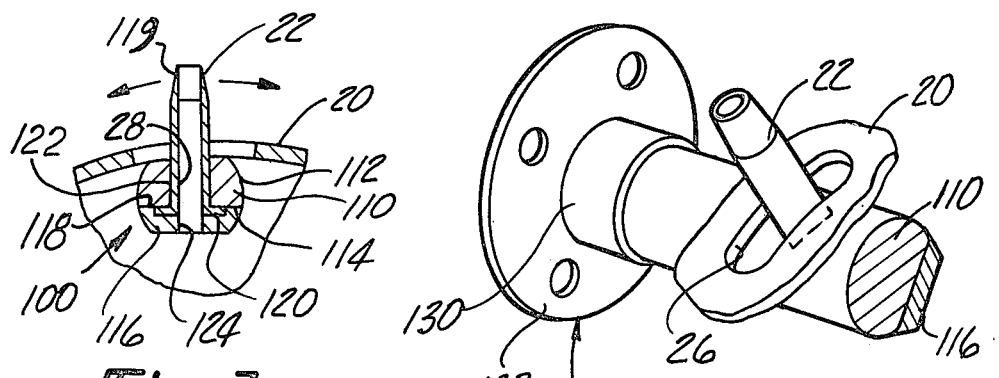
Fig-3
Fig-4

SOIL CORING IMPLEMENT

BACKGROUND OF THE INVENTION

I. Field of the Invention

The present invention relates to soil coring implements and, more particularly, to such an implement for aerating sodded areas such as lawns, golf courses, and the like.

II. Description of the Prior Art

There are several previously known soil coring implements which are particularly suited for aerating lawns, golf courses, and the like. In one type of previously known soil coring implement, the implement comprises a cylindrical and tubular rim which is towed by a vehicle via a drawbar assembly so that the rim rolls along the ground. This previously known implement further includes a plurality of soil coring elements extending radially outwardly from the rim so that each element engages and penetrates the ground. The elements are tubular so that the soil plug is received within the interior of the element. As the rim rotates, successive plugs of soil push the preceding plugs of soil up and out through the interior of the coring element and thus into the interior of the rim.

In this type of previously known soil coring implement it has been the previous practice to individually pivotally mount each coring element to the rim so that the coring element substantially vertically enters the ground and remains vertical throughout the continued rotation of the rim. Such construction is advantageous in that it prevents ripping and tearing of the soil.

While this previously known coring implement in which the coring elements are individually pivotally mounted to the rim is effective in use, the replacement of the individual coring elements has proven to be a time consuming and difficult task. Such coring elements must be periodically replaced since they become damaged when they strike stones or other hard objects in the ground.

A still further disadvantage of this type of previously known coring implement is that the individual pivotal mounting of the coring elements to the rim is relatively expensive to construct.

SUMMARY OF THE PRESENT INVENTION

The present invention provides an improved soil coring implement in which the coring elements are easily replaceable and which enjoys a relatively low manufacturing cost.

In brief, the soil coring implement of the present invention comprises a cylindrical rim which is rotatably mounted on the axle. The axle in turn is connected to a towing vehicle so that, upon towing, the rim rotates along and contacts ground.

A plurality of elongated mounting assemblies are secured within the interior of the rim and are circumferentially equidistantly spaced from each other. Each assembly is pivotal about an axis which is parallel to but radially spaced from the axis of rotation of the rim.

A plurality of tubular coring elements are secured to each mounting assembly so that each coring element extends diametrically through the assembly and radially outwardly from one side thereof. Each coring element in turn registers with a circumferentially extending slot formed through the rim so that the coring elements protrude radially outwardly from the rim.

In operation, as the rim is towed across the ground by the towing vehicle, the mounting assemblies pivot due to the weight of the coring elements so that the coring elements enter the ground substantially vertically and remain so during the continued rotation of the rim as in the previously known coring implements. The coring implement according to the present invention, however, is advantageous in that the mounting assemblies can be easily detached from the rim and replaced as required when the coring elements become broken, worn or bent. Moreover, in the preferred form of the invention the coring elements are detachably secured to their mounting assembly and can be individually replaced as required.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a side plan view showing the soil coring implement of the present invention being towed over a ground surface by a vehicle;

FIG. 2 is a fragmentary cross-sectional view taken substantially along line 2—2 in FIG. 1 and enlarged for clarity;

FIG. 3 is a fragmentary sectional view taken substantially along line 3—3 in FIG. 2 and enlarged for clarity; and FIG. 4 is a fragmentary perspective view of the coring element shown in FIG. 3 and with parts broken away for clarity.

DETAILED DESCRIPTION OF THE PRESENT INVENTION

With reference first to FIG. 1, the soil coring implement 10 of the present invention is thereshown being towed across the ground supporting surface 12 by a vehicle 14 which may be a pickup truck, tractor or the like. Hitch means 16, which will later be described in detail, are interposed between the implement 10 and the vehicle 14 and serve not only to tow the implement 10 behind the vehicle 14 but also serve to transfer a portion of the weight from the vehicle 14 and onto the implement 10. In addition, the implement 10 is rotatably connected to the hitch means by an axle 18 so that as the vehicle 14 moves rightwardly as viewed in FIG. 1, the implement 10 rotates in a clockwise manner.

Referring now to FIGS. 1–3, the implement 10 generally comprises a tubular cylindrical rim 20 of a sufficient width to include a plurality of coring elements 22 arranged transversely across the rim 20 and these coring elements 22 are also circumferentially spaced from each other around the rim 20. In addition, if desired, a number of implements 10 may be rotatably secured to the same axle 18 and simultaneously towed by the vehicle 14. Each axial end of the rim 20 is preferably closed by an axial end cover 46 thus forming a closed interior chamber 48 for a reason hereinafter described.

Still referring to FIGS. 1–3, a plurality of elongated mounting assemblies 100 are pivotally mounted to the interior of the rim 20 by bearing means 102 (FIGS. 2 and 4) at each end. Each mounting assembly 100 is arranged so that its axis is substantially parallel to but radially spaced from the rotational axis of the rim 20 and the mounting assemblies 100 are circumferentially equidistantly spaced from each other around the rim 20.

Each mounting assembly 100 extends for substantially the entire width of the rim 20.

Each mounting assembly 100 further comprises an elongated first and second part 110 and 116, respectively. The first part 110 is substantially semicircular in cross section thus having a circular outer periphery 112 and a flat side 114 while the second part 116 is a flat piece having a flat side 118 which registers with and abuts against the flat surface 114 on the first part 110. Both parts 110 and 116 of the mounting assembly extend the entire length of the mounting assembly 100 and are detachably secured together by any suitable means.

Still referring to FIGS. 2 and 3, the coring elements 22 are tubular and cylindrical in shape and have an outer free end 119 and an outwardly flared portion 120 at its other end. Each coring element 22 is positioned through a diametric bore 122 in the mounting assembly first part 110 so that the flared portion abuts against the flat side 114 of the first part 110 and also so that the outer end 119 of the coring element 22 extends radially outwardly from the first part 110. The second part 116 of the mounting assembly 100 is then secured to the first part 110 so that the flared portion 120 of the coring element 22 is sandwiched in between the surfaces 114 and 118 and thus secured to the mounting assembly 100. The second part 116 of the mounting assembly also includes a throughbore 124 which registers with the central bore 28 of the coring element 22. Thus, the coring element bore 28 is open to the interior of the rim 20.

For each mounting assembly 100, the coring elements 22 are aligned with each other. Each coring element 22 furthermore registers with a circumferentially extending slot 26 (FIG. 4) formed through the rim 20 so that the coring elements 22 extend radially outwardly from the rim 20 and can pivot with the mounting assembly 100.

Referring now to FIGS. 2 and 4, the bearing means 102 for pivotally securing the mounting assemblies 100 to the rim 20 is thereshown in greater detail and comprises a tubular socket member 130 into which one end of the mounting assembly 100 is rotatably positioned. An outwardly extending flange 132 at the other end of the socket member 130 is secured to one axial end cover 46 by nuts and bolts 134. One bearing means 102 is connected to each end of each mounting assembly 100.

Referring now particularly to FIG. 1, as the implement 10 is towed by the vehicle 14, the circumferentially extending rim slots 26 in combination with the bearing means 102 permits each mounting assembly 100 with its attached coring elements 22 to pivot, due to gravity, so that the coring elements 22 hang downwardly and enter the ground 12 generally vertically. A soil plug 50 is received within the coring element bore 28 and is removed from the ground 12. Additionally, the pivotal action of the mounting tube 100 with its attached coring elements 22 prevents the coring elements 22 from ripping or tearing the ground surface 12 despite continued rotation of the rim 20.

Referring now to FIG. 1, in order to insure a firm and relatively deep penetration of the coring elements 22 into the ground surface 12, the hitch means 16 further includes a mechanism to transfer a portion of the weight of the vehicle 14 onto the implement 10. The hitch means 16 is mounted by brackets 30 to the vehicle 14 and includes a pair of spaced and parallel horizontal legs 32 extending rearwardly of the vehicle 14. A shaft 34 is rotatably secured between the rearwardly extending legs 32 and spaced and parallel arms 36 are pivotally secured at one end to the implement axis 18 and at their other end to the shaft 34. Thus, the arms 36 rotate in unison with the shaft 34. A hydraulic cylinder 38 and piston 40 arrangement is positioned between the brackets 30 and the shaft 34 so that the cylinder 38 is pivotally secured to the upper end of the bracket 30 while the piston 40 is pivotally secured by a pin 42 to a second bracket 44 on the shaft assembly 34. The second bracket 44 extends above and rearwardly of the shaft assembly 34 so that retraction of the piston 40 into its cylinder 38 raises the implement 10 above the ground surface 12 while, conversely, extension of the piston 40 from its cylinder 38 causes the shaft assembly 34, arm 36 and the bracket 44 to rotate in a counterclockwise direction thus forcing the implement towards the ground 12. Further extension of the piston 40 causes the vehicle to raise somewhat thereby transferring a portion of the weight from the vehicle 14 and to the implement 10.

As previously described, the axial end covers 46 define the closed interior chamber 48 within the implement 10. Thus, as the soil plugs 50 are removed from the ground 12, the soil plugs 50 are contained within this closed interior chamber 48.

Referring now to FIG. 1, in order to permit the soil plugs 50 to be emptied or dumped from the interior chamber 48 of the implement, an arc or circumferential section of the rim 20 forms a door 52 which is secured to the rim 20 by a hinge 54 having a pivotal axis parallel to and spaced from the axis of the rim 20 so that the door is movable between an open and a closed position. A conventional latch assembly 56 is provided to secure the door 52 in a closed position thereby preventing unintended opening of the door 52. In order to empty the soil plugs from the chamber 48, the implement 10 is raised by the hydraulic piston and cylinder, the door 52 is opened and the rim 20 is manually rotated to dump the soil plugs up through the opening formed by the door 52.

It can thus be seen that the soil coring implement of the present invention provides a new and novel means for mounting the coring elements 22 to the rim 20. The mounting assemblies 100 can be rapidly, easily and inexpensively mounted to the rim 20 to facilitate the construction of the implement 10. Moreover, in the preferred form of the invention, the coring elements 22 are detachably mounted to their mounting assembly 100 by merely detaching the mounting assembly parts 110 and 116 from each other and removing the coring elements 22. Damaged coring elements 22 can be individually replaced, and after replacement, the mounting assembly 100 with its new coring elements 22 can be resecured to the implement 10.

Having described my invention, however, many modifications thereto will become apparent to those skilled in the art to which it pertains without deviation from the spirit of the invention as defined by the scope of the appended claims.

I claim:

1. A soil penetrating and coring implement adapted to be connected to and pulled over a ground surface by a vehicle, said implement comprising:

a tubular cylindrical rim of a predetermined axial length, said rim having a plurality of circumferentially extending slots formed about its outer periphery, said slots being circumferentially and axially spaced from each other;

axle means for rotatably mounted said rim so that said rim rotates about its axis as the implement is pulled by the vehicle;

a plurality of elongated mounting assemblies, said mounting assemblies being substantially cylindrical in shape along their entire length, and means for individually detachably and freely pivotally securing said assemblies to the interior of said rim so that said assemblies are circumferentially spaced about said rim and pivotal about an axis parallel to but radially spaced from the axis of said rim; and a plurality of tubular coring elements and means for detachably securing a plurality of said coring elements to each mounted assembly, each coring element registering with a diametric throughbore in its mounting assembly and having a portion extending radially outwardly from one side of its mounting assembly, said outwardly extending portion of each coring element extending through a registering slot in said rim and protruding radially outwardly from said rim;

whereby said mounting assemblies are individually removable from said rim whereupon said coring elements are individually replaceable in said removed mounting assembly wherein each mounting assembly further comprises a first elongated part and a second elongated part, each part having a longitudinally extending and substantially planar surface which flatly abuts against a like surface on the other part, wherein each diametric throughbore is formed by registering bores formed through the mounting assembly parts, said registering bores extending substantially perpendicularly with respect to said surfaces, wherein each coring element includes a flared out portion at one end having a cross sectional area greater than the diameter of said registering bores, said coring elements being insertable through bores in one mounting assembly part so that the flared out portion abuts against said surface of said one mounting assembly part, and fastening means for detachably securing said parts together so that said flared out portion of said coring elements are sandwiched in between said surfaces on said mounting assemblies wherein the other mounting assembly includes a recess in its planar surface around each bore and in which the flared out portion of the coring element is positioned and wherein said means for pivotally securing each mounting assembly comprises a socket detachably secured to each rim, each socket having a cylindrical recess into which one end of the mounting assembly is positioned.

2. The invention as defined in claim 1 and further comprising an end cover secured to and enclosing each axial end of the rim.

3. The invention as defined in claim 2 and further comprising door means for gaining access into the interior of said rim.

* * * * *